United States Patent [19]

Payne

[11] Patent Number: 5,409,145
[45] Date of Patent: Apr. 25, 1995

[54] BOTTLE FOR CONTAINING AND DISPENSING OIL

[76] Inventor: Donnie R. Payne, 9110 Hwy. 155, Montevallo, Ala. 35115

[21] Appl. No.: 200,003

[22] Filed: Feb. 22, 1994

[51] Int. Cl.⁶ ............................................. B65D 37/00
[52] U.S. Cl. .................................. 222/212; 222/538; 222/543
[58] Field of Search ............... 222/212, 538, 543, 562, 222/568, 215, 530

[56] References Cited

U.S. PATENT DOCUMENTS

| | | | |
|---|---|---|---|
| 145,999 | 12/1873 | Hallock | 222/530 X |
| 2,019,579 | 11/1935 | Paull | 222/530 |
| 2,653,848 | 9/1953 | Lee | 222/538 X |
| 2,792,975 | 5/1957 | Yorker | 222/568 X |
| 2,792,976 | 5/1957 | Stewart | 222/530 X |
| 3,109,563 | 11/1963 | Morales | 222/538 X |
| 3,282,478 | 11/1966 | Russell | 222/543 X |
| 4,090,647 | 5/1978 | Dunning | 222/543 |
| 4,805,814 | 2/1989 | Allen, Sr. | 222/538 |
| 4,819,838 | 4/1989 | Hart, Jr. | 222/538 |
| 5,090,602 | 2/1992 | Link | 222/527 X |

FOREIGN PATENT DOCUMENTS 2909449 9/1980 Germany ............................ 222/215

*Primary Examiner*—Andres Kashnikow
*Assistant Examiner*—Kenneth Bomberg

[57] ABSTRACT

Disclosed is a new container for small engine oil for providing a storage and dispensing container specifically configured for use with small engines such as those used on portable generators, lawn mowers, and the like which have constricted, slow moving oil fill openings. The new container has additional enhancements for retail display whereby a product may be easily recognized by a customer as being specifically for use with small engines. The container for small engine oil comprises a hollow container body in which oil may be stored. The container body has an outlet portion formed thereon including a substantially elongated neck in communicating relationship with the hollow interior. A spout for directing flow out of the container body is threadedly mounted on the neck and includes an elongated tapered tube having an annular groove formed on the outside thereof. A closure comprises a conical cap snapidly removedly engagable with the annular groove of the spout whereby oil within the hollow interior is prevented from exiting therefrom through the spout. The closure also includes an integral closure retainer comprising a resilient filamentous member extending from the spout to the closure whereby the closure is captivated proximal to the spout when removed for dispensing oil therefrom. The new container for small engine oil further includes an add-on extension tube for directing oil from the container into an inaccessible small engine oil fill opening. The tube is removedly clipedly engagable with attachment clips formed on the container body when not in use for dispensing oil, whereby the tube is retained proximal to the container for future use.

1 Claim, 2 Drawing Sheets

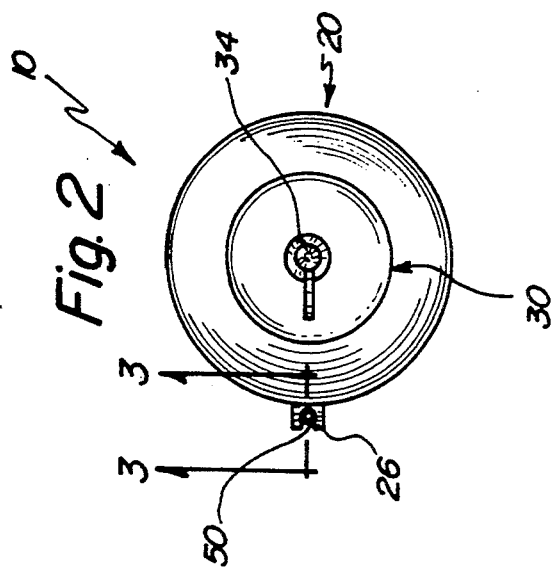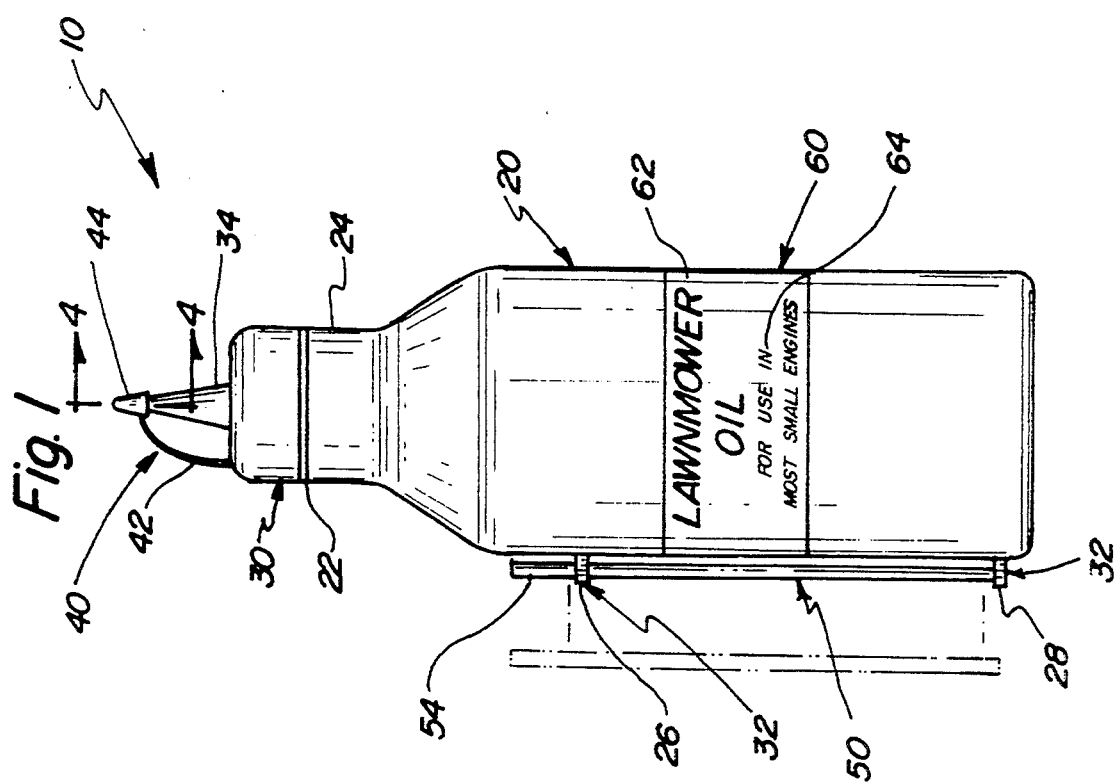

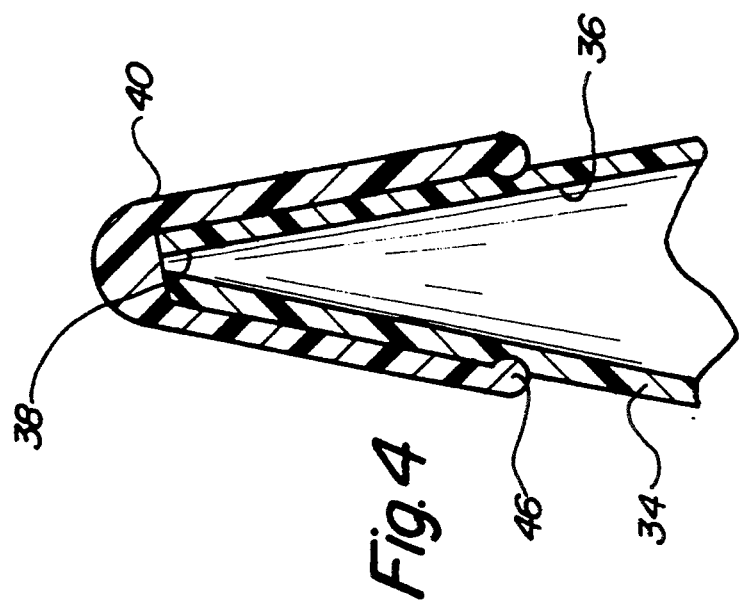
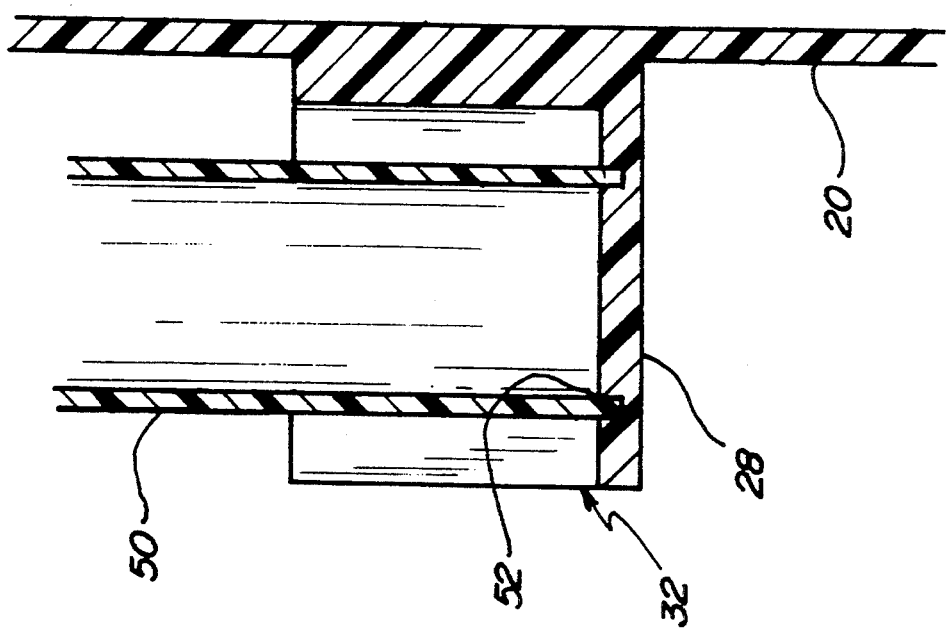

BOTTLE FOR CONTAINING AND DISPENSING OIL

BACKGROUND OF THE INVENTION

1. Field of the Invention

The present invention relates to engine oil containers and more particularly pertains to containers for small engine oil which may be adapted for providing a storage and dispensing container specifically configured for use with small engines such as used on portable generators, lawn mowers, and the like which have constricted, slow moving oil fill openings and additionally for retail display whereby a product may be easily recognized by a customer as being specifically for use with small engines.

2. Description of the Prior Art

The use of engine oil containers is known in the prior art. More specifically, engine oil containers heretofore devised and utilized for the purpose of storing, transporting, and dispensing engine fluids are known to consist basically of familiar, expected and obvious structural configurations, notwithstanding the myriad of designs encompassed by the crowded prior art which have been developed for the fulfillment of countless objectives and requirements.

The present invention is directed to improving devices for providing a storage and dispensing container specifically configured for use with small engines such as used on portable generators, lawn mowers, and the like in a manner which is safe, secure, economical and aesthetically pleasing.

For example, U.S. Pat. No. 4,976,379 to Sloan discloses a dispensing container with integral funnel comprising a container and closure assembly including a funnel attached to a closure portion thereof and specifically to facilitate emptying of the contents of the container into a given receiving opening or receptacle, such as applying motor oil to the oil fill orifice located on a motor vehicle engine, without spilling the contents. A membrane is normally positioned in sealing relation to the open end of the container and the funnel is movable between an operative and an inoperation position and is specifically structured to puncture the membrane when in the operative position to allow free flow of the contents from the container through the funnel and into the receiving opening, port, etc.

U.S. Pat. No. 5,123,570 to Dubow et al. describes a container for inverted dispensing engine oil including a self-contained plunger with a cutting head that permits dispensing of the oil in an inverted position in cramped spaces. The container includes a foil or other frangible seal across the spout opening that is pierced by manual actuation of the plunger after the container is inverted. The container base includes a flexible area for pressing manually against the plunger end. The invention permits dispensing of oil into an engine without spillage in engine compartments having limited space for positioning the oil container.

The prior art also discloses other oil containers as shown in U.S. Pat. Des. No. 260,968 to Pavia et al., U.S. Pat. Des. No. 291,658 to Klette et al., and U.S. Pat. Des. No. 293,653 to Peters.

While these devices fulfill their respective, particular objectives and requirements, the aforementioned patents do not disclose a container for small engine oil for providing a storage and dispensing container specifically configured for use with small engines such as used on portable generators, lawn mowers, and the like which have constricted, slow moving oil fill openings. Furthermore, none of the prior art engine oil containers teach or suggest the additional enhancements for retail display whereby a product may be easily recognized by a customer as being specifically for use with small engines.

In this respect, the container for small engine oil according to the present invention substantially departs from the conventional concepts and designs of the prior art, and in so doing provides an apparatus primarily developed for the purpose of providing a storage and dispensing container specifically configured for use with small engines such as used on portable generators, lawn mowers, and the like which have constricted, slow moving oil fill openings and additionally for retail display whereby a product may be easily recognized by a customer as being specifically for use with small engines.

Therefore, it can be appreciated that there exists a continuing need for new containers for small engine oil which can be used for providing a storage and dispensing container specifically configured for use with small engines such as used on portable generators, lawn mowers, and the like which have constricted, slow moving oil fill openings and additionally for retail display whereby a product may be easily recognized by a customer as being specifically for use with small engines. In this regard, the present invention on substantially fulfills this need.

As illustrated by the background art, efforts are continuously being made in an attempt to develop devices for storing, transporting, and dispensing engine fluids. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of engine oil containers now present in the prior art, the present invention provides an improved engine oil container construction wherein the same can be utilized for providing a storage and dispensing container specifically configured for use with small engines such as used on portable generators, lawn mowers, and the like which have constricted, slow moving oil fill openings and additionally for retail display whereby a product may be easily recognized by a customer as being specifically for use with small engines. As such, the general purpose of the present invention, which will be described subsequently in greater detail, is to provide a new container for small engine oil apparatus and method which has all the advantages of the prior art engine oil containers and none of the disadvantages.

The invention is defined by the appended claims with the specific embodiment shown in the attached drawings. For the purpose of summarizing the invention, the invention may be incorporated into a new container for small engine oil for providing a storage and dispensing container specifically configured for use with small engines such as those used on portable generators, lawn mowers, and the like which have constricted, slow moving oil fill openings. The new container has additional enhancements for retail display whereby a product may be easily recognized by a customer as being specifically for use with small engines. The container for small engine oil comprises a container body comprising a hollow interior in which oil may be stored. The container body has an outlet portion formed thereon, the outlet portion including a substantially elongated neck having one open end and an opposite end formed on the neck adjacent the body and in communicating relationship with the hollow interior. The container body also has attachment means formed thereon comprising a plurality of spaced apart clips extending laterally from the side of the container body. The clips are aligned with each other longitudinal to the container body. Spout means for directing flow out of the container body is threadedly mounted on the neck and in communicating relationship with the open end of the neck. The spout means includes an elongated tapered tube having an annular groove formed on the outside thereof. Closure means comprises a conical cap snapidly removedly engagable with the annular groove of the spout means whereby oil within the hollow interior is prevented from exiting therefrom through the spout means. The closure means also has closure retaining means comprising a resilient filamentous member fixedly connected at one end to the spout means and fixedly connected at the other end to the closure means whereby the closure means is captivated proximal to the spout means when removed for dispensing oil therefrom. The new container for small engine oil further includes add-on extension tube means whereby the length of the spout means may be functionally increased for directing oil from the container into an inaccessible small engine oil fill opening. The add-on extension tube means comprises an elongated tube removedly snapidly engagable at at least one end with the annular groove of the spout means and in communicating relationship with the spout means for dispensing oil therefrom. The tube is also removedly clipedly engagable with the attachment means of the container body when not in use for dispensing oil, whereby the tube is retained proximal to the container for future use dispensing oil. Finally, label means is fixedly attached to the outside of the container body whereby the user is notified that the oil contained therein is specifically for use with small engines. The label means includes distinctively colored graphics and legends whereby enhancing product brand recognition.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a storage and dispensing container specifically configured for use with small engines such as used on portable generators, lawn mowers, and the like which have constricted, slow moving oil fill openings.

It is another object of the present invention to provide a new container for small engine oil which may be easily and efficiently manufactured and marketed.

It is a further object of the present invention to provide a new container for small engine oil which is of a durable and reliable construction.

An even further object of the present invention is to provide a new container for small engine oil which is susceptible of a low cost of manufacture with regard to both materials and labor, and which accordingly is then susceptible of low prices of sale to the consuming public, thereby making such containers for small engine oils economically available to the buying public.

Still yet another object of the present invention is to provide a new container for small engine oil which provides in the apparatuses and methods of the prior art some of the advantages thereof, while simultaneously overcoming some of the disadvantages normally associated therewith.

Still yet another object of the present invention is to provide a new container for small engine oil that is enhanced for retail display whereby a product may be easily recognized by a customer as being specifically for use with small engines.

Yet another object of the present invention is to provide a new container for small engine oil that eases the task of adding oil to a small engine thereby encouraging owners to perform oil checks and changes on a regular basis thus prolonging the life of the engine.

Even still another object of the present invention is to provide a new container for small engine oil that is recloseable for protecting the unused portion therein from contaminants and spills.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the new container for small engine oil.

FIG. 2 is a top plan view of the invention of FIG. 1.

FIG. 3 is a sectional view of the invention of FIG. 2 taken along the line 3—3.

FIG. 4 is a sectional view of the invention of FIG. 1 taken along the line 4—4 and detailing the closure snapped into the annular groove of the spout.

DESCRIPTION OF THE PREFERRED EMBODIMENT

With reference now to the drawings, and in particular to FIG. 1 thereof, a new container for small engine oil embodying the principles and concepts of the present invention and generally designated by the reference numeral 10 will be described.

From an overview standpoint, the container for small engine oil is adapted for use for providing a storage and dispensing container specifically configured for use with small engines such as used on portable generators, lawn mowers, and the like which have constricted, slow moving oil fill openings and additionally for retail display whereby a product may be easily recognized by a customer as being specifically for use with small engines. See FIG. 1.

With reference now to FIGS. 1-4 and more specifically, it will be noted that a new container for small engine oil 10 is shown. The container for small engine oil 10 comprises a container body 20 comprising a hollow interior in which oil may be stored. The container body 20 has an outlet portion 22 formed thereon, the outlet portion 22 including a substantially elongated neck 24 having one open end and an opposite end formed on the neck adjacent the body and in communicating relationship with the hollow interior. The container body 20 also has attachment means 32 formed thereon comprising a plurality of spaced apart clips 26 and 28 extending laterally from the side of the container body 20.

The clips 26 and 28 are aligned with each other longitudinal to the container body 20. Spout means 30 for directing flow out of the container body 20 is threadedly mounted on the neck 24 and in communicating relationship with the open end of the neck. The spout means 30 includes an elongated tapered tube 34 having an annular groove 36 formed on the outside thereof. Closure means 40 comprises a conical cap 44 having a raised lip 46 formed therein snapidly removedly engagable with the annular groove 36 of the tapered tube 34 whereby ,oil within the hollow interior is prevented from exiting therefrom through the spout means 30.

The closure means 40 also has closure retaining means comprising a resilient filamentous member 42 fixedly connected at one end to the spout means 30 and fixedly connected at the other end to the cap 44 whereby the cap 44 is captivated proximal to the spout means 30 when removed for dispensing oil therefrom. The new container for small engine oil 10 further includes add-on extension tube means 50 whereby the length of the spout means 30 may be functionally increased for directing oil from the container 10 into an inaccessible small engine oil fill opening.

The add-on extension tube means 50 comprises an elongated tube 54 removedly snapidly engagable at at least one end with the annular groove 36 of the tapered tube 34 and in communicating relationship with the spout means 30 for dispensing oil therefrom. The tube 54 is also removedly clipedly engagable with the attachment means 32 of the container body 20 when not in use for dispensing oil, whereby the tube 54 is retained proximal to the container 10 for future use dispensing oil. As shown in FIG. 3, the attachment means 32 includes a Finally, label means 60 is fixedly attached to the outside of the container body 20 Whereby the user is notified that the oil contained therein is specifically for use with small engines. The label means 60 includes distinctively colored graphics 62 and legends 64 whereby enhancing product brand recognition. As can be seen in FIG. 1, the graphics 62 are located on the label means 60 which is in a rectangular configuration on the side of the container body 20. The clips 26 and 28 for the tube means 50 is located adjacent one side of the label means so as to not obscure the graphics 62 on the label means.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A container for small engine oil for providing a storage and dispensing container specifically configured for use with small engines which have constricted, slow moving oil fill openings and additionally for retail display whereby a product may be easily recognized by a customer as being specifically for use with small engines, the container for small engine oil comprising:

a container body comprising a hollow interior in which oil may be stored, the container body having an outlet portion formed thereon, the outlet portion including a substantially elongated neck having one open end and an opposite end formed on the neck adjacent the body and in communicating relationship with the hollow interior, the container body also having attachment means formed thereon comprising a plurality of spaced apart clips extending laterally from the side of the container body, one of said plurality of spaced apart clips including a groove, the clips being aligned with each other longitudinal to the container body;

spout means for directing flow out of the container body mounted on the neck and in communicating relationship with the open end of the neck, the spout means including an elongated tapered tube having an annular groove formed on the outside thereof;

closure means comprising a central cap snapidly removably engagable with the annular groove of the spout means whereby oil within the hollow interior is prevented from exiting therefrom through the spout means, the closure means also having closure retaining means comprising a resilient filamentous member fixedly connected at one end to the spout means and fixedly connected at the other end to the closure means whereby the closure means is captivated proximal to the spout means when removed for dispensing oil therefrom;

add-on extension tube means whereby the length of the spout means may be functionally increased for directing oil from the container into an inaccessible small engine oil fill opening, the add-on extension tube means comprising an elongated tube removedly snapidly engagable at at least one end with the annular groove of the spout means and in communicating relationship with the spout means for dispensing oil therefrom, the tube also being removedly clipedly engagable with the attachment means of the container body when not in use for dispensing oil whereby the tube is, supported by said groove of said clip and is retained proximal to the container for future use dispensing oil; and label means fixedly attached to the outside of the container body whereby the user is notified that the oil contained therein is specifically for use with small engines, the label means including distinctively colored graphics and legends whereby enhancing product brand recognition, the graphics being located on the label means in a rectangular configuration on the side of the container body with the clips for supporting the tube being located adjacent to one side of the label means so as to not obscure the graphics on the label means.

* * * * *